United States Patent
Kato et al.

(10) Patent No.: US 6,915,688 B2
(45) Date of Patent: Jul. 12, 2005

(54) GAS-FLOW MEASURING INSTRUMENT

(75) Inventors: Yukio Kato, Ibaraki (JP); Hiromu Kikawa, Ibaraki (JP); Shinya Igarashi, Ibaraki (JP); Akira Takasago, Tokyo (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/607,017

(22) Filed: Jun. 27, 2003

(65) Prior Publication Data

US 2004/0003659 A1 Jan. 8, 2004

(30) Foreign Application Priority Data

Jul. 1, 2002 (JP) ........................................ 2002-191580

(51) Int. Cl.[7] ................................................. G01F 5/00
(52) U.S. Cl. ..................................................... 73/202.5
(58) Field of Search ........................... 73/202.5, 204.22, 73/118.2, 204.21

(56) References Cited

U.S. PATENT DOCUMENTS

| | | | |
|---|---|---|---|
| 4,571,996 A | * | 2/1986 | Wakeman et al. ......... 73/202.5 |
| 5,942,683 A | * | 8/1999 | Aoi et al. .................. 73/202.5 |
| 6,298,720 B1 | * | 10/2001 | Mueller et al. ............ 73/202.5 |
| 6,332,356 B1 | | 12/2001 | Hecht et al. |

FOREIGN PATENT DOCUMENTS

| | | |
|---|---|---|
| DE | 100 19 149 A | 11/2001 |
| EP | 1 164 360 | 12/2001 |
| JP | 11-248505 | 9/1999 |
| JP | 2000-304585 | 11/2000 |
| WO | 02/18886 | 3/2002 |

* cited by examiner

*Primary Examiner*—Edward Lefkowitz
*Assistant Examiner*—Jewel V. Thompson
(74) *Attorney, Agent, or Firm*—Mattingly, Stanger, Malur & Brundidge, P.C.

(57) ABSTRACT

In a gas-flow measuring instrument for measuring a gas flow in an intake gas passage for sucking gas, an abnormal output, deterioration per hour, stain, and breakage of a flow measuring element caused by fluid and foreign materials contained in intake gas are reduced. A gas-flow measuring instrument disposed in an intake gas passage for sucking gas for measuring a gas flow includes a bypass passage for bringing gas flowing along the intake gas passage, a bypass passage inlet opened to the upstream side of a main stream direction of gas in the intake gas passage, and a flow measuring element disposed in the bypass passage.

10 Claims, 6 Drawing Sheets

GAS-FLOW MEASURING INSTRUMENT

BACKGROUND OF THE INVENTION

1. Field of the Invention

The present invention relates to gas-flow measuring instruments for measuring a gas flow of intake gas, and in particular relates to a gas-flow measuring instrument for mainly measuring a gas flow in an intake gas passage for sucking gas.

2. Description of the Related Art

Although there are no publicly known examples describing the reduction in an effect of water splashes on a flow measuring element, which is a main object of the present invention, conventional techniques, which are similar to the present invention, directed to isolating foreign materials using an inertial force of a foreign material contained in intake gas are as follows.

(1) Japanese Publication of Unexamined Patent Application No. 11-248505 discloses that a bypass passage is divided into two and a flow measuring element is arranged in a first bypass passage. Dust breaking into the bypass passage is directed and isolated to a second bypass passage opened in a velocity vector direction. However, by construction, the mainstream of air flowing through the bypass passage becomes the second bypass passage, in which the flow measuring element is not arranged, so that a sufficiently stable airflow cannot be obtained in the first bypass passage, and there is a problem that flow measuring accuracies are deteriorated to a large extent.

SUMMARY OF THE INVENTION

A gas-flow measuring instrument according to the present invention may be mainly arranged within an intake gas passage for sucking gas, and in particular arranged within an intake gas passage of an internal combustion engine for automobiles. In the intake gas passage of an internal combustion engine for automobiles, fluid represented by water may possibly intrude so as to enter the portion of the intake gas passage where the flow measuring instrument is installed. If fluid splashes contained in intake gas are stuck to the flow measuring element, an output variation of the flow measuring element is produced by a momentary change in radiant heat of the flow measuring element, so that deterioration per hour due to a rapid variation in temperature may occur or heat stress may cause damage to the flow measuring element.

In order to solve the problems described above, a gas-flow measuring instrument according to the present invention comprises an intake gas passage for sucking gas and a flow measuring element, wherein there is provided a bypass passage for bringing the gas flowing through the intake gas passage so as to arrange the flow measuring element therein.

The gas-flow measuring instrument comprising the intake gas passage for sucking gas and the flow measuring element for measuring a gas flow further comprises detouring means for detouring water splashes arranged in a flow path where the flow measuring element exists.

DESCRIPTION OF THE PREFERRED EMBODIMENTS

The present invention incorporates configurations of a bypass passage capable of isolating water splashes contained in gas, which cause damage such as deterioration per hour, output variations, and breakage to a flow measuring element utilizing inertial forces of the splashes, the configurations of the bypass passage being also capable of holding a sufficient gaseous body flow in a portion where the flow measuring element is arranged.

Embodiments of the present invention will be described below with reference to FIGS. 1 to 12.

Figure 1:
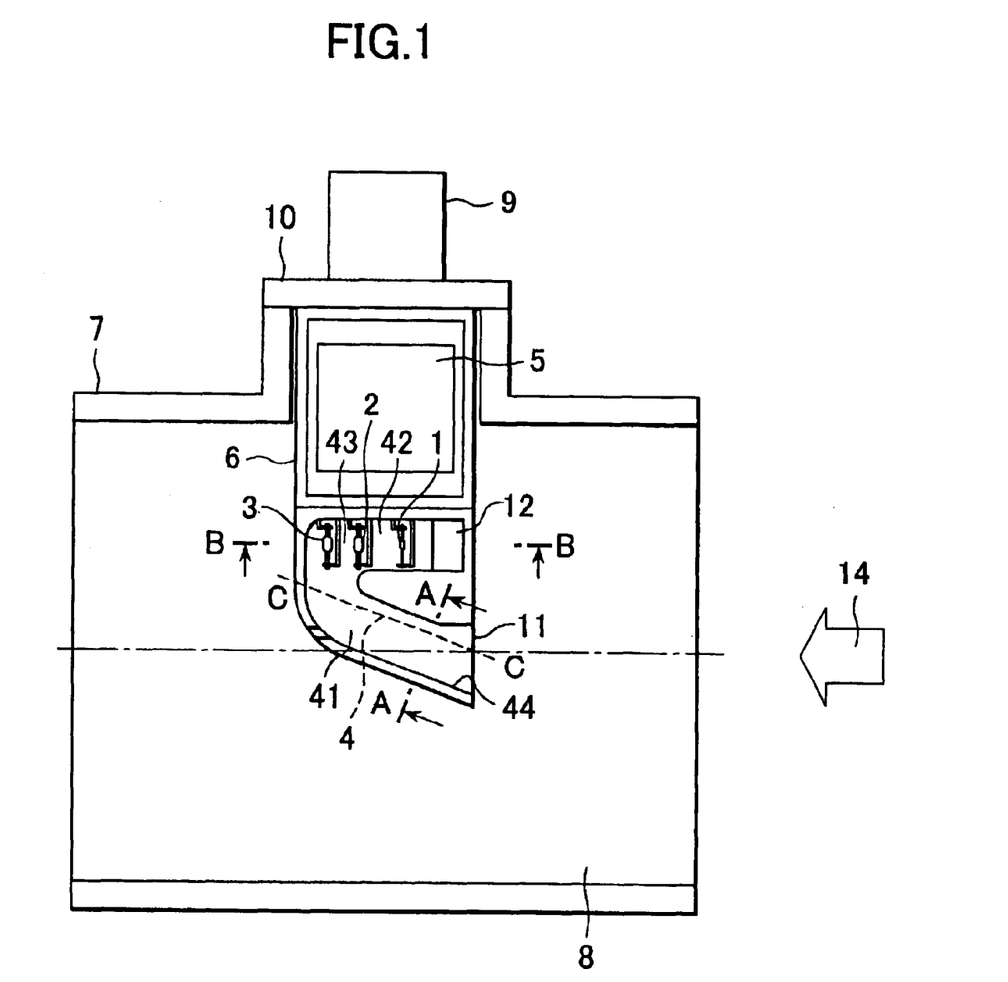
FIG. 1 is a longitudinal sectional view of a gas-flow measuring instrument according to an embodiment of the present invention.

FIG. 1 is a longitudinal sectional view of a gas-flow measuring instrument according to an embodiment of the present invention. In an intake gas passage 8 for sucking gas, a module housing 6 of the gas-flow measuring instrument is attached with a module flange 10 therebetween. At an end extremity of the module housing 6, a bypass passage 4 is provided, and within the bypass passage 4, a heating resistor 1, a temperature sensing resistor 2, and a temperature sensor 3 are arranged. The heating resistor 1 and the temperature sensing resistor 2 are connected to an electronic circuit 5 arranged in the module housing 6, which in turn is electrically connected outside via connector 9. The bypass passage 4 is constituted of a first passage 41 arranged from the upstream-side of the intake gas passage 8 to the downstream side, a second passage 42 arranged from the downstream-side to the upstream side, a third passage 43 communicating the first passage 41 with the vicinity of the end of the second passage in the downstream-side of the intake gas passage 8, and a bypass passage outlet 12 opened substantially in parallel with a mainstream direction 14 of intake gas arranged in the vicinity of the downstream end of the second passage 42 (the upstream side of the intake gas passage 8), so as to form a detouring configuration. Furthermore, the first passage 41 is inclined to the axis of the intake gas passage 8, and the heating resistor 1, the temperature sensing resistor 2, and the temperature sensor 3 are arranged in the second passage 42. In addition, the mainstream direction 14 is equal to the direction indicated by a dash-dotted line and the axial direction of the first passage 41 is indicated by a broken line C—C.

According to the above configuration, fluid proceeding inside the bypass passage 4 goes straight by its own velocity and the inertial force due to its mass so as to abut on a wall of the first passage 41, which is inclined relative to the axial direction of the intake gas passage 8, so as to be stuck on the wall. The fluid stuck on the wall proceeds directly along an outside contour wall 44 of the bypass passage 4 in the detouring direction without splashing again into intake gas so as to be exhausted to the intake gas passage 8 again from the bypass passage outlet 12 without contacting the heating resistor 1 arranged in the vicinity of the rear of the bypass passage 4. Even in this case, because the inertial force of gas itself is extremely smaller than that of the water splash, the gas flows along the detouring route of the bypass passage 4, so that a sufficient velocity necessary for stable measurement can also be obtained in the vicinity of the flow measuring element.

Figure 2:
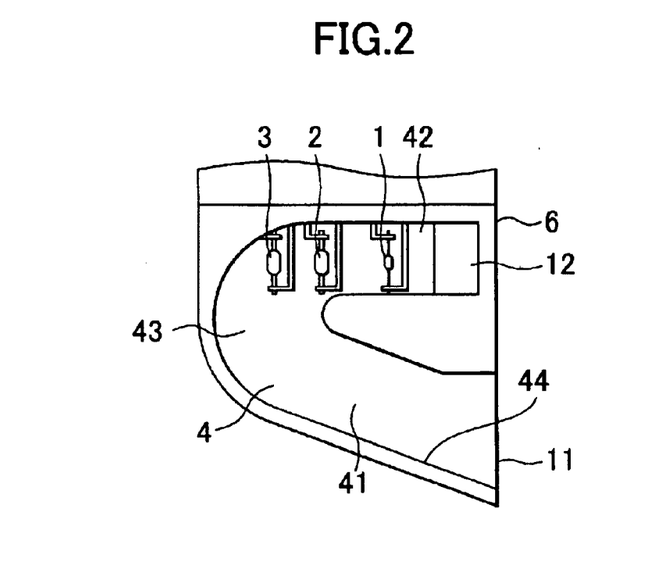
FIG. 2 is a longitudinal sectional view of a bypass passage of the gas-flow measuring instrument according to the embodiment of the present invention.

FIG. 2 is a longitudinal sectional view of the bypass passage 4 of the gas-flow measuring instrument according to the embodiment of the present invention, and it is an example of a detouring configuration of the bypass passage. Junctional regions between the third passage 43 and the first passage 41 and between the third passage 43 and the second passage 42 are formed to have continuous curves of the outside contour wall 44 along the detouring direction of the bypass passage 4.

Figure 3:
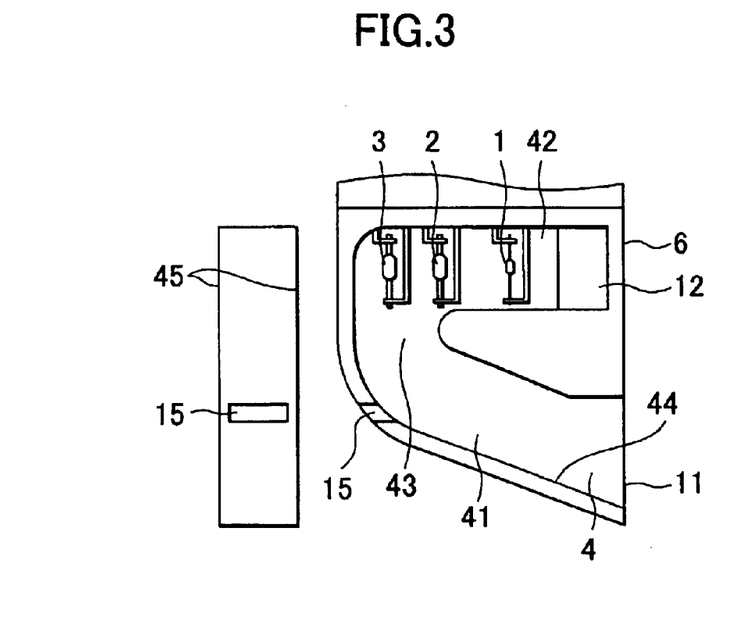
FIG. 3 is a longitudinal sectional view of a bypass passage of a gas-flow measuring instrument according to another embodiment of the present invention.

FIG. 3 includes a longitudinal sectional view of a bypass passage 4 of a gas-flow measuring instrument according to another embodiment of the present invention. Different from the embodiment shown in FIG. 1, it has a feature that a vent 15 is provided in the vicinity of the junctional region between the third passage 43 and the first passage 41 inside the bypass passage 4 so as to communicate the bypass passage 4 with the intake gas passage 8. The right side is the longitudinal sectional view of the bypass passage 4 of the gas-flow measuring instrument and the left side is a side view thereof viewed from the downstream side of the intake gas passage 8. According to this configuration, the fluid stuck on the bypass passage outside contour wall 44 of the first passage 41 can be effectively discharged outside the bypass passage 4 before it reaches the heating resistor 1.

Figure 4:
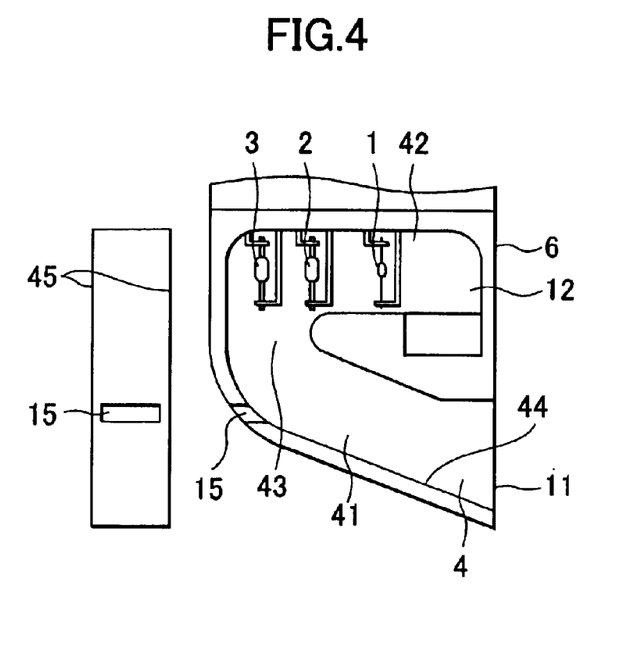
FIG. 4 is a longitudinal sectional view of a bypass passage of a gas-flow measuring instrument according to another embodiment of the present invention.

FIG. 4 is a longitudinal sectional view of another embodiment, in which the position of the bypass passage outlet 12 is different from that of the bypass passage outlet shown in FIGS. 1 and 3. Other arrangement thereof is equal to that of FIG. 3. The bypass passage outlet 12 of the type is opened substantially in parallel with an intake gas flow flowing inside the intake gas passage 8 so as to detour at about 90° in a direction of a bypass passage inlet 11 on the upstream side of the intake gas passage 8 to have the bypass passage outlet 12 opened on the bypass passage both-side walls 45. According to this configuration, the length of the bypass passage 4 can be increased without changing the bypass passage inlet 11 and the bypass passage outlet 12 along the axial line of the intake gas passage 8 so as to be able to reduce the output detection error produced upon occurrence of a pulsation flow even within about the same shape and size.

Figure 5:
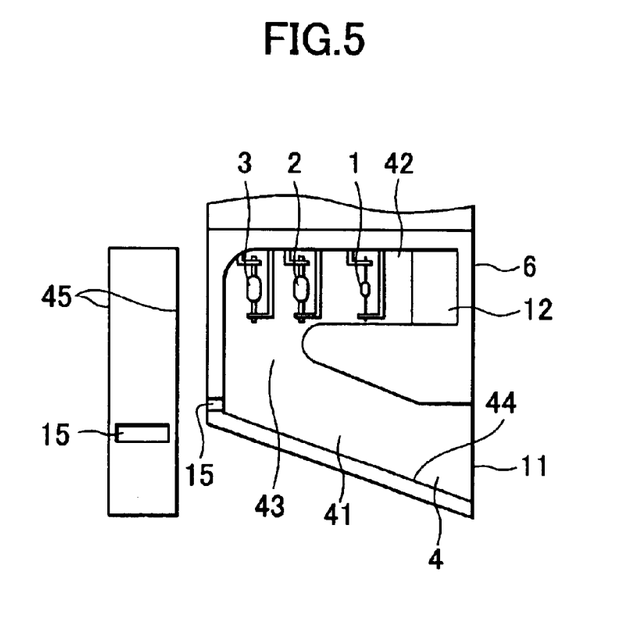
FIG. 5 is a longitudinal sectional view of a bypass passage of a gas-flow measuring instrument according to another embodiment of the present invention.

FIG. 5 is a longitudinal sectional view of another embodiment, in which the junctional region between the third passage 43 and the first passage 41 is linearly connected in comparison with the embodiment shown in FIG. 3. Other arrangement thereof is equal to that of FIG. 3. Furthermore, the vent 15 is provided on the front to which the bypass passage outside contour wall 44 proceeds directly from the upstream side of the intake gas passage 8 to the downstream side so as to communicate the bypass passage 4 with the intake gas passage 8. According to this structure, the fluid stuck on the bypass passage outside contour wall 44 proceeds directly along the bypass passage outside contour wall 44. By the vent 15 formed at a position to which the fluid proceeds directly, the fluid can be effectively discharged outside the bypass passage 4 before it reaches the heating resistor 1.

Figure 6:
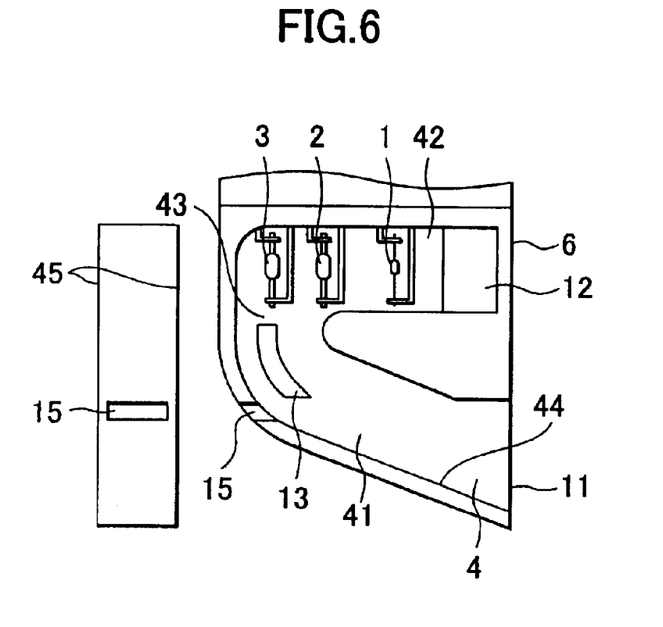
FIG. 6 is a longitudinal sectional view of a bypass passage of a gas-flow measuring instrument according to another embodiment of the present invention.

FIG. 6 is a longitudinal sectional view of another embodiment, in which a partition 13 is provided in the vicinity of the junctional region between the third passage 43 and the first passage 41 so as to separate the bypass passage 4 in the detouring direction in comparison with the embodiment shown in FIG. 3. Other arrangement thereof is equal to that of FIG. 3. According to this structure, fluid proceeding inside the bypass passage 4 goes straight by the inertial force due to its own weight and velocity so as to abut on the bypass passage outside contour wall 44 of the third passage 43. By providing the partition 13, the fluid stuck on the bypass passage outside contour wall 44 in the inclined part of the passage is prevented from splashing again caused by a swirl flow, etc., produced in the detouring part of the bypass passage 4. Therefore, the fluid stuck on the bypass passage outside contour wall 44 proceeds more effectively along the bypass passage outside contour wall 44 of the bypass passage 4.

Figure 7:
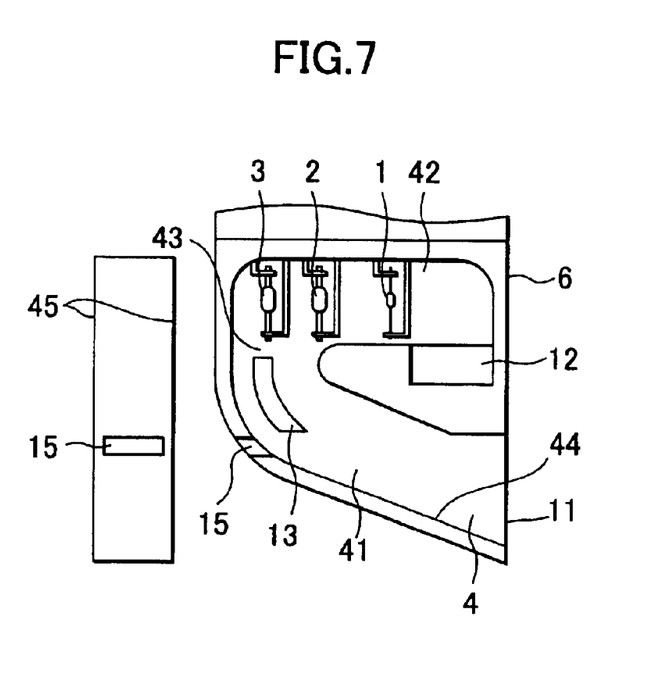
FIG. 7 is a longitudinal sectional view of a bypass passage of a gas-flow measuring instrument according to another embodiment of the present invention.

FIG. 7 is a longitudinal sectional view of another embodiment, in which the structure of the bypass passage outlet 12 is equalized to that of FIG. 4 in comparison with the embodiment shown in FIG. 6.

Figure 8:
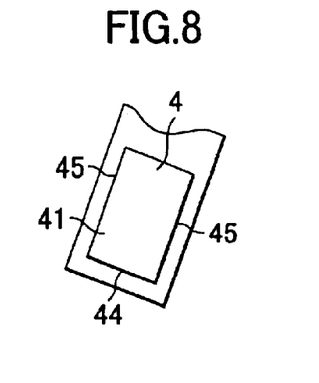
FIG. 8 is a schematic cross-sectional view of the bypass passage according to the embodiment of the present invention.

FIG. 8 is a cross-sectional view at the line A—A of FIG. 1, which is perpendicular to the axial direction of the bypass passage 4, showing another embodiment of the cross-section of the bypass passage 4.

Figure 9:
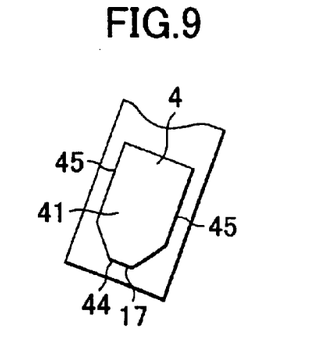
FIG. 9 is a schematic cross-sectional view of a bypass passage according to another embodiment of the present invention.

FIG. 9 is a cross-sectional view at the line A—A of FIG. 1, which is perpendicular to the axial direction of the bypass passage 4, showing another embodiment of the cross-section of the bypass passage 4. Beveling inclined surfaces are provided in the junctional regions between the bypass passage outside contour wall 44 located in the external peripheral side of the bypass passage 4 in the detouring direction and the bypass passage both-side walls 45 forming the bypass passage 4 and arranged substantially in parallel with the axial direction of the intake gas passage 8. According to this structure, the fluid entering the bypass passage 4 and stuck to the bypass passage outside contour wall 44 in the detouring direction of the fluid bypass passage, i.e., to a ditch 17, can be effectively accumulated. Also, by inclining the bypass passage both-side walls 45 of the ditch 17 to some extent, the reflection of a water splash when the water splash abuts the bypass passage outside contour wall can be directed more close to the bypass passage outside contour surface, thereby more increasing the separation effect of the water splash. It is preferably effective that the range of the inclination be 60° to 120°.

Figure 10:
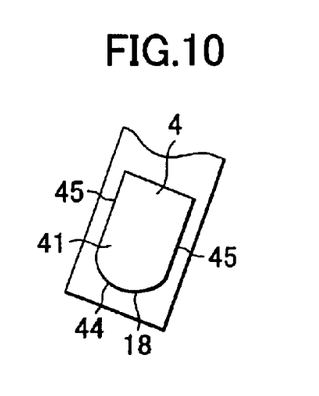
FIG. 10 is a schematic cross-sectional view of a bypass passage according to another embodiment of the present invention.

FIG. 10 is a cross-sectional view at the line A—A of FIG. 1, showing another embodiment of the cross-section of the bypass passage 4. The bypass passage both-side walls 45 located in the outside contour surface in the detouring direction of the bypass passage 4 are U-shaped. According to this structure, the fluid entering the bypass passage 4 is accumulated to an extreme external part 18 of the bypass passage outside contour wall 44.

Figure 11:
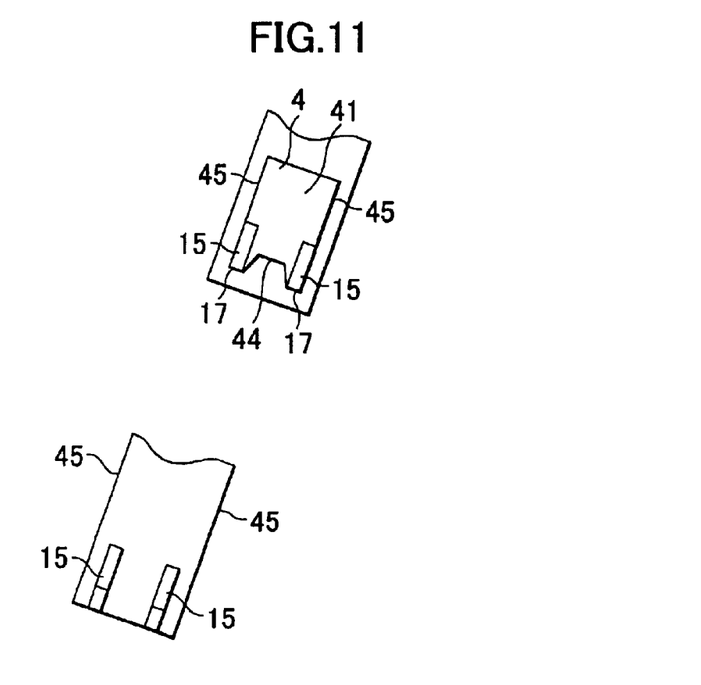
FIG. 11 is a schematic cross-sectional view of a bypass passage according to another embodiment of the present invention.

FIG. 11 is a cross-sectional view at the line A—A of FIG. 1, showing another embodiment of the cross-section of the bypass passage 4. The ditches 17 are provided in the junctional regions between the bypass passage outside contour wall 44 and the bypass passage both-side walls 45, and sidewalls of the ditches 17 adjacent to the center of the bypass passage 4 are inclined relative to the bypass passage both-side walls 45. According to the embodiment, the range of the inclination is 30° to 60°. According to this structure, the fluid entering the bypass passage 4 is accumulated into the two ditches 17 of the bypass passage outside contour wall 44.

Figure 12:
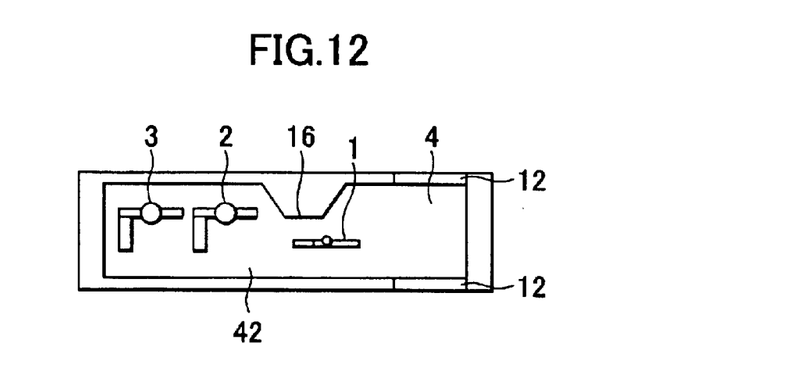
FIG. 12 is a cross-sectional view of the bypass passage according to the embodiment of the present invention.

FIG. 12 is a cross-sectional view at the line B—B of FIG. 1, showing another embodiment of the cross-section of the bypass passage 4. A venturi 16 is provided in the vicinity of the heating resistor 1 arranged in the bypass passage 4. According to this structure, the area of the second passage 42 is contracted in the vicinity of the heating resistor 1. The flow velocity of intake gas entering the bypass passage 4 is thereby increased. Even if a slow intake gas flow is sucked, the turbulence of the intake flow is stabilized, enabling output noise to be reduced.

The fluid contained in intake gas has been described as above; dust contained in intake gas is also to proceed directly by its own inertial force similarly to fluid droplets. Therefore, the dust is accumulated on the outside contour surface of the bypass passage so as to be exhausted outside the bypass passage without abutting the flow measuring element arranged substantially at the center of the bypass passage. Accordingly, output variations per hour produced by changes in the heat capacity of the flow measuring element caused by the dust sticking to the flow measuring element can be effectively prevented, and mechanical damage of the flow measuring element itself produced by the dust, etc., abutting the flow measuring element can also be prevented. Moreover, the dust, etc., entering the bypass passage abuts the bypass passage wall at one time or several times. Kinetic energy of the dust is consumed by the abutment, so that when the dust arrives at the flow measuring element, the kinetic energy thereof has been reduced, enabling damage subjected by the flow measuring element to be reduced even if the dust abuts the flow measuring element.

Furthermore, since the invention has a feature of only the configuration of the bypass passage, the advantages cannot be reduced over a period of time and consecutive advantages can be obtained.

According to the present invention, output variations and deterioration of a flow measuring element produced by the sticking of fluid splashes and dust, which are contained in intake gas, to the flow measuring element can be prevented.

What is claimed is:

1. A gas-flow measuring instrument comprising:
   a main passage having an intake gas passage for sucking gas;
   a bypass passage into which part of gas flowing through the main passage flows;
   a flow measuring element disposed within the bypass passage for sensing a gas flow; and
   an electronic circuit electrically connected to the flow measuring element,
   wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage and said third passage includes a curve portion to change a flow direction of said intake gas in said bypass passage to flow said intake gas upstream with respect to said mainstream direction.

2. A gas-flow measuring instrument according to claim 1, further comprising a temperature sensing resistor for compensating temperature of sucked gas and a temperature sensor for sensing temperature of sucked gas, wherein the flow measuring element comprising a heating resistor, the temperature sensing resister, and the temperature sensor are arranged in the second passage.

3. A gas-flow measuring instrument according to claim 1, wherein the bypass passage further comprises a detour constructed by joining the third passage to the first passage and a detour constructed by joining the third passage to the second passage, and
   wherein an outside contour wall of the bypass passage of at least one of the both detours is continuously curved.

4. A gas-flow measuring instrument according to claim 1, further comprising a venturi arranged in between the vicinity of a junctional region between the second passage and the third passage and the vicinity of the flow measuring element.

5. A gas-flow measuring instrument comprising:
   a main passage having an intake gas passage for sucking gas;
   a bypass passage into which part of gas flowing through the main passage flows;
   a flow measuring element disposed within the bypass passage for sensing a gas flow; and
   an electronic circuit electrically connected to the flow measuring element,
   wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage,
   wherein the detour constructed by joining the third passage to the first passage is provided with a vent formed on the outside contour wall of the bypass passage for connecting the bypass passage to the intake gas passage.

6. A gas-flow measuring instrument comprising:
   a main passage having an intake gas passage for sucking gas;
   a bypass passage into which part of gas flowing through the main passage flows;
   a flow measuring element disposed within the bypass passage for sensing a gas flow; and
   an electronic circuit electrically connected to the flow measuring element,
   wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage,
   wherein an outside contour surface in a detouring direction of the bypass passage of at least one of the first passage, the second passage, and the third passage is provided with a ditch arranged substantially in parallel with an axial direction of the bypass passage.

7. A gas-flow measuring instrument comprising:

a main passage having an intake gas passage for sucking gas;

a bypass passage into which part of gas flowing through the main passage flows;

a flow measuring element disposed within the bypass passage for sensing a gas flow; and an electronic circuit electrically connected to the flow measuring element, wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage, wherein a section of the bypass passage perpendicular to the axial direction of the bypass passage is substantially rectangular, and both sidewalls of the ditch arranged substantially in parallel with the axial direction of the bypass passage on the outside contour surface of the bypass passage in the detouring direction are not in parallel with each other, so that an angle between the both sidewalls of the ditch ranges from 60° to 120°.

8. A gas-flow measuring instrument comprising:

a main passage having an intake gas passage for sucking gas;

a bypass passage into which part of gas flowing through the main passage flows;

a flow measuring element disposed within the bypass passage for sensing a gas flow; and an electronic circuit electrically connected to the flow measuring element, wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage, wherein a section of the bypass passage perpendicular to the axial direction of the bypass passage is substantially rectangular, and the ditches arranged on the outside contour surface of the bypass passage in the detouring direction are respectively located in vicinities of junctional regions between the outside contour surface and both sidewalls arranged in parallel with the intake gas passage and constituting the bypass passage, and sidewalls of the ditches located adjacent to the center of the bypass passage are inclined to the both sidewalls at an angle of 30° to 60°.

9. A gas-flow measuring instrument comprising:

a main passage having an intake gas passage for sucking gas;

a bypass passage into which part of gas flowing through the main passage flows;

a flow measuring element disposed within the bypass passage for sensing a gas flow; and an electronic circuit electrically connected to the flow measuring element, wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage, wherein a section of the bypass passage perpendicular to the axial direction of the bypass passage is substantially rectangular, and the outside contour wall of the bypass passage in the detouring direction and junctional regions between bypass passage both sidewalls and the outside contour wall are curved surfaces.

10. A gas-flow measuring instrument comprising:

a main passage having an intake gas passage for sucking gas;

a bypass passage into which part of gas flowing through the main passage flows;

a flow measuring element disposed within the bypass passage for sensing a gas flow; and an electronic circuit electrically connected to the flow measuring element, wherein the bypass passage comprises a bypass-passage inlet opened to an upstream side in a gas mainstream direction of the intake gas passage, a first passage arranged from the upstream-side of the intake gas passage to the downstream side and inclined relative to the mainstream direction, a second passage arranged from the downstream-side to the upstream side and having the flow measuring element arranged therein, a third passage connecting the first passage to the second passage in the downstream-side of the mainstream direction, and a bypass-passage outlet arranged in the second passage, further comprising a partition arranged in the vicinity of a junctional region between the first passage and the third passage for separating the bypass passage into external and internal peripheral directions relative to the detouring direction of the bypass passage.

* * * * *